US009262948B2

(12) United States Patent
Pounders

(10) Patent No.: US 9,262,948 B2
(45) Date of Patent: Feb. 16, 2016

(54) DEPLOYABLE COLLAPSIBLE INDOOR-OUTDOOR SIGN ASSEMBLY

(71) Applicant: Joel Pounders, Kentwood, MI (US)

(72) Inventor: Joel Pounders, Kentwood, MI (US)

( * ) Notice: Subject to any disclaimer, the term of this patent is extended or adjusted under 35 U.S.C. 154(b) by 125 days.

(21) Appl. No.: 13/913,285

(22) Filed: Jun. 7, 2013

(65) Prior Publication Data

US 2014/0360066 A1 Dec. 11, 2014

Related U.S. Application Data

(63) Continuation-in-part of application No. 13/165,493, filed on Jun. 21, 2011, now abandoned.

(51) Int. Cl.
*F16M 13/00* (2006.01)
*G09F 13/02* (2006.01)
*G09F 15/00* (2006.01)

(52) U.S. Cl.
CPC ............ *G09F 13/02* (2013.01); *G09F 15/0018* (2013.01); *G09F 15/0037* (2013.01); *G09F 15/0087* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 1,744,321 | A * | 1/1930 | Markman | | 362/382 |
| 3,218,746 | A * | 11/1965 | Hawkins, Jr. | | 40/606.17 |
| 4,249,715 | A * | 2/1981 | Repp | | 248/545 |
| 4,258,494 | A * | 3/1981 | Borque | | 40/606.19 |
| 4,279,104 | A | 7/1981 | Classen | | |
| 4,326,352 | A | 4/1982 | Barth | | |
| 4,327,514 | A * | 5/1982 | Bourque | | 40/607.06 |
| 4,343,449 | A * | 8/1982 | Osthus | | 248/156 |
| 4,357,772 | A * | 11/1982 | Amick et al. | | 40/605 |
| 4,402,166 | A * | 9/1983 | Wortham, Jr. | | 52/155 |
| 4,483,506 | A * | 11/1984 | Litwiller | | 248/545 |
| 4,524,533 | A * | 6/1985 | Still, Jr. | | 40/607.06 |
| 4,825,575 | A * | 5/1989 | Rethke | | 40/610 |
| 4,843,746 | A * | 7/1989 | DesNoyers et al. | | 40/607.04 |
| 4,910,901 | A * | 3/1990 | Boyar | | 40/607.06 |
| 4,916,840 | A * | 4/1990 | Getz | | 40/605 |
| 4,939,877 | A * | 7/1990 | Claffey | | 52/155 |
| 5,088,680 | A * | 2/1992 | Farmer | | 248/523 |
| 5,103,582 | A * | 4/1992 | Farmer | | 40/607.12 |
| 5,230,176 | A * | 7/1993 | Schomaker | | 40/607.11 |
| 5,340,065 | A * | 8/1994 | Thomas | | 248/150 |
| 5,375,801 | A * | 12/1994 | Porter | | 248/156 |
| 5,400,535 | A * | 3/1995 | Schomaker | | 40/607.11 |
| 5,467,076 | A * | 11/1995 | Ruocco et al. | | 340/571 |
| 5,502,910 | A * | 4/1996 | Lucchesi | | 40/607.06 |
| 5,722,205 | A * | 3/1998 | Gannaway | | 52/155 |
| 5,833,181 | A * | 11/1998 | DesNoyers | | 248/156 |
| 5,903,991 | A * | 5/1999 | Sasse | | 40/607.04 |
| 6,334,596 | B1 * | 1/2002 | Temple | | 248/156 |
| 6,513,284 | B1 * | 2/2003 | Sandlin | | 47/66.6 |
| 6,575,423 | B2 * | 6/2003 | Erwin | | 248/533 |
| 6,827,321 | B1 * | 12/2004 | Murren et al. | | 248/519 |
| 6,948,283 | B2 * | 9/2005 | Burkart et al. | | 52/155 |
| 7,036,255 | B1 * | 5/2006 | Santana et al. | | 40/607.09 |
| 7,089,694 | B2 * | 8/2006 | Allen | | 40/607.04 |
| 7,175,141 | B2 * | 2/2007 | Bolinder et al. | | 248/156 |
| 7,231,735 | B2 * | 6/2007 | Gelbert | | 40/541 |
| 7,389,603 | B1 | 6/2008 | Brumfield | | |
| 7,546,992 | B1 * | 6/2009 | Cappolina | | 248/166 |

(Continued)

*Primary Examiner* — Monica Millner
(74) *Attorney, Agent, or Firm* — Robert J. SayFie

(57) ABSTRACT

A collapsible and deployable indoor-outdoor sign assembly that can easily and quickly be installed, taken down, and transported, and still have excellent stability, strength, and longevity.

9 Claims, 8 Drawing Sheets

(56) References Cited

U.S. PATENT DOCUMENTS

| | | | | |
|---|---|---|---|---|
| 7,878,478 | B2 * | 2/2011 | Gumm | 248/529 |
| 8,028,448 | B2 * | 10/2011 | Amrani | 40/607.09 |
| 8,646,735 | B2 * | 2/2014 | Bradley | 248/121 |
| 2004/0206860 | A1 * | 10/2004 | Bolinder | 248/156 |
| 2005/0189005 | A1 * | 9/2005 | Smith et al. | 135/16 |
| 2006/0016111 | A1 * | 1/2006 | Simmons | 40/607.04 |
| 2006/0101690 | A1 * | 5/2006 | Terbet, Jr. | 40/607.09 |
| 2006/0185203 | A1 | 8/2006 | Bittle | |
| 2006/0260160 | A1 * | 11/2006 | Herman | 40/540 |
| 2010/0328933 | A1 * | 12/2010 | Maldonado | 362/183 |
| 2011/0308990 | A1 * | 12/2011 | Pounders | 206/525 |

* cited by examiner

DEPLOYABLE COLLAPSIBLE INDOOR-OUTDOOR SIGN ASSEMBLY

RELATED APPLICATION

This application claims priority from a patent application filed on 21 Jun. 2011, application Ser. No. 13/165,493, which claims priority from a provisional patent application filed on 21 Jun. 2010, application No. 61/397,991.

GOVERNMENT RIGHTS

This invention was not made with Government support. The Government does not have any rights in this invention.

BACKGROUND OF THE INVENTION

The transport and deployment of temporary signs is used in many different professions, such as realtors, day care centers, or temporary home workers. Realtors for example place signs in yards to inform people that a particular parcel may be for sale, or that an open house event may be taking place.

Small signs, such as those made of ¼ inch metal poles are currently used by some. A larger sign may draw more attention, however the larger sign may be impossible or inconvenient to transport and/or set up.

What is needed is a large attractive sign, which is lightweight, and can be collapsible and deployable.

The present invention is a real estate marketing accessory with exterior and interior bases that were designed for multiple business applications, along with avoiding the problems with currently used sign products. The parts can ban be dismantled and placed into the storage bag for easy transport and available for immediate ground installation at the next listing appointment or used with an interior base in an office or product show. The unique telescoping pole and cross bar are important for the sing to be quickly dismantled or assembled from/to a storage bag and extending to one that is nearly six (6) feet tall. It weighs about 18 lbs and takes approximately 10 minutes to assemble or disassemble. This means a small person can manage the process and transport as needed. Many realtors are women and such ease is meaningful to them. In addition, this new and distinctive product advertises for both a quality property and professional realtor. Image is everything!

There are two major parts to the product with associated smaller parts: First, the two different bases: The exterior base is standard while the interior base is an option. The second part is the telescoping upright PVC post with the cross bar to hold an advertising sign with adjustable position clips. The cross bar is counter balanced to off-set the weight of the realtor's sign so that the pole maintains its upright position. A solar light is optional and provides night time visibility.

These two different steel, powder coated bases that support the telescoping PVC pole. The exterior use one can easily be driven into the ground even when the ground is frozen in northern climates. The four "prongs" on the bottom provides extra stability in any type of soil, especially sand and very soft soil, where most other posts eventually lean if not cemented in place.

The interior base has wheels to be easily moved about in an office or building with or without the telescoping pole assembled. Some users have found it convenient to have both types of bases. One to leave in the ground and the other when using at vendor or product shows or conferences: Just pick up the PVC parts leaving the exterior base in place and use the sign on an interior base for a conference, vendor show or office and then replace it afterwards on its alternate base.

How this product differs from others that are typically used in the business.

1. The metal signs rust and are utilitarian in appearance. These are known to damage cars and clothing when transported and being set up. The Best Portable Sign does not have sharp edges and has a protective storage bag. The metal exterior base is powder coated to prevent rusting.
2. The wooden fixed poles are usually installed by a company after being ordered by the realtor. These are awkward and need a strong person to dig a hole to install and later the strength to lift and remove. There is also a fee for service by a sub-contracting firm. Installation and removal with the associated service fees means a time delay after a property listing is signed and may be as long as a week to ten (10) days! Seasonal installs are further delayed when the ground is frozen. Contrast that to an immediate notice to the area that the property is now for sale. The Best Portable Sign can be installed immediately after a listing appointment in approximately 10 minutes even in the winter. Time is money in business!

Since the pieces are separate, easy to handle and lightweight anyone can assemble or dismantle it. The base is designed with the shape and stabilizing prongs for sand and other soft soils to maintain an upright position and support the weight of the realtor's sign by counter pressure. The wooden poles tend to lean in soft soils unless otherwise supported.

3. Durability. A property listing may lost for a very short period of time or extend into years. The powder coated base and PVC materials maintain quality appearance for the time involved. The parts are durable with an extended life time and seldom need replacing.
4. Ease of use and versatile; Transportable and easily stored in a car or home when not in use. A smaller sized person can manage and lift the various parts. The multiple use feature with the bases means that it can be used and applicable to many opportunities to advertise a property realtor.
5. Appearance: It is a new attractive, eye-catching product and the design has its own distinct appearance. It maintains the upright position when placed into the ground, along with the realtor's sign on the counter balanced cross bar support.

Testimonials evidence may include evidence of "secondary considerations," such as "commercial success, long felt but unsolved needs, [and] failure of others." Graham v. John Deere Co., 383 U.S. at 17, 148 USPQ at 467. See also, e.g., In re Piasecki, 745 F.2d 1468, 1473, 223 USPQ 785, 788 (Fed. Cir. 1984) (commercial success).

One testimonial if from a Mr. Fujimoto, who indicates that his 13 year old son, and 12 year old daughter installed it. This indicates how easy it is to assemble, without the need of any fasteners to erect the post. He further states that he has never used a sign that is durable, and yet easy to install and disassemble.

The second testimonial is from a Mr. Helder who has been a real estate agent/broker for 34 years, and has extensive experience using signs for his profession. He also states the ease of assembly, disassembly, and lightweight of the present invention.

Other testimonials were submitted on the applicant's web page, and include the following:

"I placed one of your sign's on a high traffic area in the community where I live and I had several people tell me that they've seen my name all over town. My sign is more visible and my customers really like the way the sign stand's out. I'd recommend the solar light. In the February 2011 Blizzard all of my signs were still standing and unlike my frame signs that the snowplow destroys I didn't have to replace one sign. I've placed my old framed sign on listings and about a week or two later replaced them with your sign and in almost every case my customer called me right away and loved what they saw." . . . . Dan Burrill/Smith-Diamond Realty

- - -

"Hi, Just wanted to let you know how great your signs are. Within one day of putting up your sign, Carol had an offer on the house and we continue to receive comments about how great they look and everyone loves that they light up. Thanks so much!" . . . . Carol/Carol Park Homes—Sanford

- - -

"I wanted to let you know that the new portable sign that you placed in front of our house has not gone unnoticed. The solar light literally stops traffic. Several neighbors, friends, and relatives have stopped to inquire about the new sign and have provided very favorable comments. Great innovation. I believe you have a winner with this product." . . . . Lou Priest/Seller—Grand Rapids

- - -

"To whom it may concern, I have recently started using Best Portable Signs to dress up my sign appearance. I have been doing real estate for 15 years and have never had anyone compliment me on my sign. This company came out with a solar lit sign so people driving by my listings in the evening time can see that I have that home listed and during the day the sign has a very classy post that is incredibly lightweight and easy to install. I have had a few compliment me on my sign and of course my clients love the fact that even in the dark their home is being advertised with this well lit sign. I believe this company has taken signs to the next level and I am glad they came up with not only a sign you can see at night but a very attractive post that only enhances my sign panel. I highly recommend using them. For what we pay for frames for our signs I think this is a far better way to represent a seller for not much more. The best part of it all is it is easy to transport (comes in a easy to carry bag), it is very good quality, the sharpest posts I have ever seen and it lights up in the evening so you are getting more exposure. It is worth checking into." . . . . Michelle Postma/Five Star Real Estate Joel, I wanted to express to you how appreciative we are of your new inventive sign posts. The YMCA has started a new direction of programming in the central city of Grand Rapids and we needed a fresh new way to market our programs to those passing by on the streets.

Your signs have worked out perfectly. They are easy to roll out on the side walk at the open of the business day and back in when programming is over. We have been able to hang white boards from the signs so we can constantly change the message we are sharing with the community. Several program participants share with us that they would have not known we were offering programming had they not seen the sign.

Thank you so much for sharing this great tool with us. It has helping our programming grow.

Take care,

Nicole Hansen

YMCA Healthy Living Operations Director

SUMMARY OF THE INVENTION

One aspect of the present invention is a deployable collapsible sign assembly 10, comprising: a stake 150 capable of being disposed within the ground, said stake having an upper plate 270; a first vertical member 20 slidably disposed over said stake 150, and a second vertical member 30 slidably disposed within said first vertical member 20, said second vertical member 30 having a bottom 350 capable of contacting said upper plate 270, said second vertical member 30 having a second vertical member aperture 50 that is higher on one side then the other to create an offset 280.

Another aspect is a collapsible sign post assembly 10, comprising: a first vertical member 20 having an inner sleeve 190; a second vertical member 30 slidably disposed within said first vertical member 20, said second vertical member 30 capable of sliding within said first vertical member for storage, said second vertical member 30 having a bottom 350 that is capable of contacting an upper plate 270 on a stake 150, said first vertical member 20 extending downwardly to a first vertical member termination 380, whereby when said first vertical member 20 is positioned downwardly over said stake 150, said first vertical member termination 380 can be descended to be adjacent to the ground; said second vertical member 30 having a second vertical member aperture 50; said second vertical member aperture 50 having a first lower edge 290 and a first higher edge 400 disposed upwardly from a second lower edge 410 and second higher edge 300 to create an offset 280, whereby when a horizontal member 40 is removably disposed within said second vertical member aperture 50 any downward force against said first lower edge 290 secures the horizontal member 40 in place.

These and other features, aspects and advantages of the present invention will become better understood with reference to the following drawings, description and claims.

DETAILED DESCRIPTION OF THE PRESENT INVENTION

Figure 1:
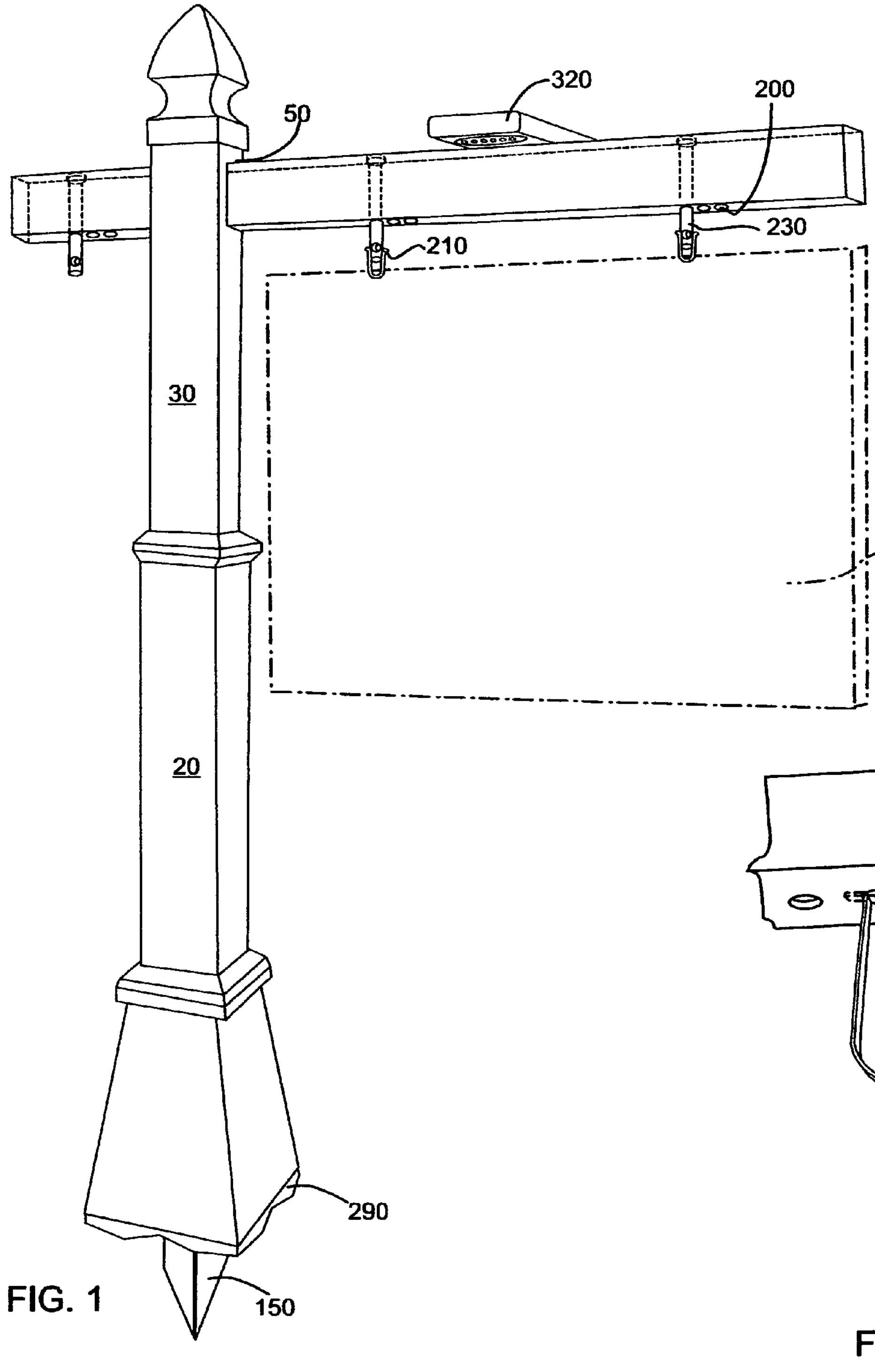
FIG. 1 is a pictorial of an embodiment of the present invention when assembled and in use.

10 collapsible sign post assembly
20 first vertical member
30 second vertical member
40 horizontal member
50 second vertical member aperture
60 container
70 strap-sign connection means
80 strap
90 sign
100 eye screw/U-clip
110 hook/C-clip
120 securement means
130 right portion
140 left portion
150 ground support means
160 first internal support
170 second internal support
180 foot drive member
190 first vertical member internal sleeve
200 horizontal member aperture
210 U-clip
220 C-clip
230 clevis pin
240 stabilizer plate
250 lower plate
250' modified lower plate
260 middle plate
270 upper plate
280 offset
290 first lower edge
300 second higher edge
310 decorative lower cover
320 solar light
330 point
340 insecticidal foam
350 bottom
360 slider
370 fastener
380 first vertical member termination
400 first higher edge
410 second lower edge
420 pole
500 shock absorber plate
510 indoor base
520 teeth
530 outer edges
540 wheel
550 base legs Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

FIG. 1 illustrates a collapsible sign post assembly 10. The collapsible sign post assembly 10 may be fixed in the ground by first inserting into the ground a ground support means or stake 150, as illustrated more fully in FIG. 2. The stake 150 may have a lower plate 250, a middle plate 260, and upper plate 270. The stake 150 may terminate in a point 330 on one end. The lower plate 250 may provide for a limit on the depth of the stake 150, and when in the ground would be substantially flush with the ground. The lower plate 250 may be between the point 330 and a middle plate 260. The middle plate 260 may be disposed upwardly from the lower plate 250. The upper plate 270 may be disposed upwardly from the middle plate 260. The middle plate 260 and upper plate 270 may fit just inside the inside an internal sleeve 190 of the first vertical member 20, so that the first vertical member 20 fits and slides over the middle plate 260 and the upper plate 270, yet be nearly contacting the substantial portion of the perimeter of the middle plate 260 and the upper plate 270, so that the first vertical member 20 has minimal lateral movement to create a stable fit. The first vertical member 20 may extend downwardly to a first vertical member termination 380.

Figure 3:
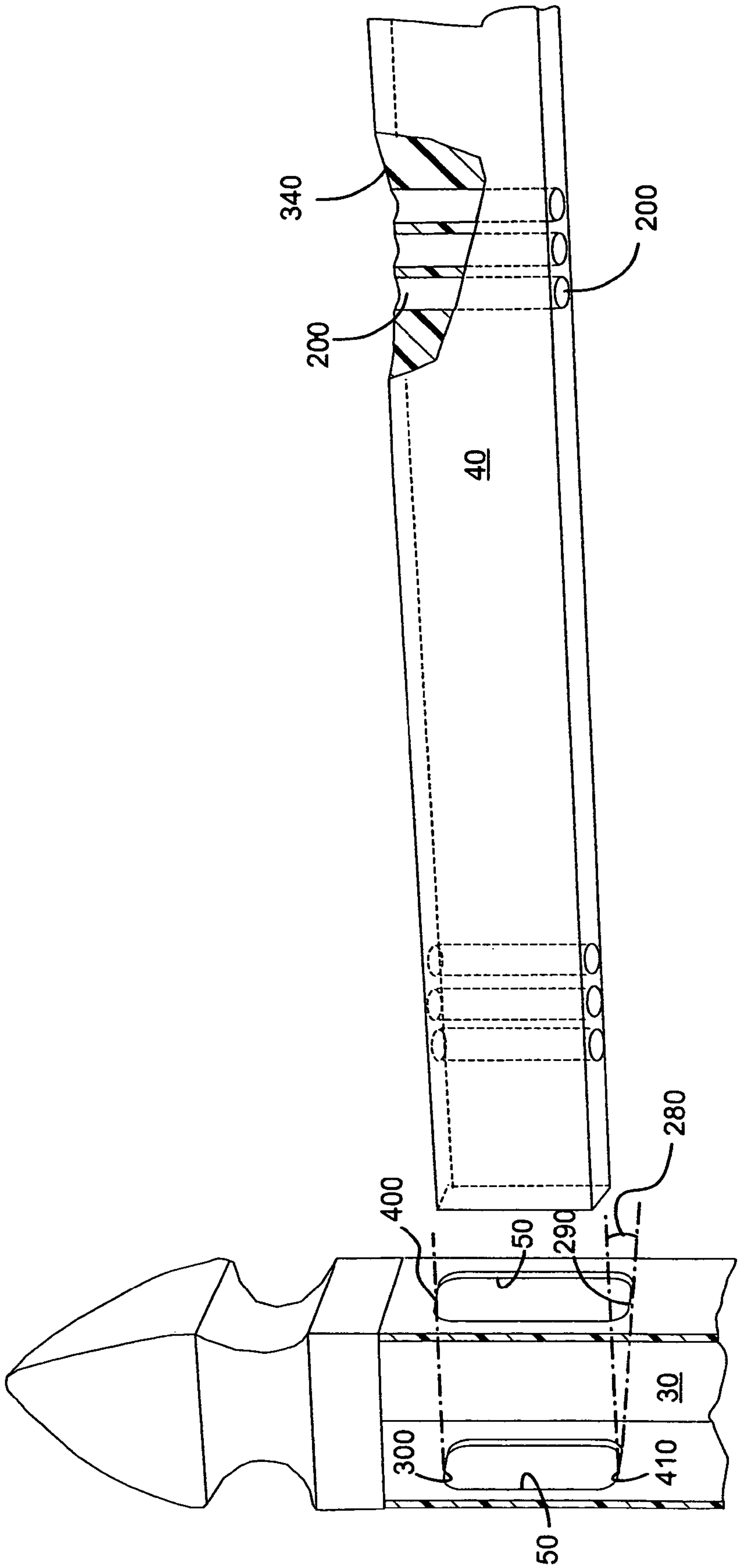
FIG. 3 is a pictorial view of an embodiment of the first vertical member's relationship to the horizontal member.

The second vertical member 30 may slide within the first vertical member 20. Whereby when the first vertical member 20 is slid over the stake 150, the upper plate 270 may contact the lower edge of the second vertical member 30 to cause the second vertical member 30 to telescope upwardly with relation to the first vertical member 20. The second vertical member 30 may have a second vertical member aperture 50 to slidably receive and hold a horizontal member 40. As seen in FIG. 3, the second vertical member aperture 50 may be lower on one side then the other to create an offset 280. The horizontal member 40 may then be slid within the second vertical member aperture 50 at a slight angle so that the heavier portion of the horizontal member is extending outwardly from the higher portion of the second vertical member aperture 50. Therefore as the heavier portion of the horizontal member is forced downwardly by gravity against the lower edge 290 of the higher portion of the second vertical member aperture 50, the horizontal member is forced against the higher edge 300 of the lower portion of the second vertical member aperture 50 to create a tight fit between the horizontal member 40 and the second vertical member aperture 50. In other words, the second vertical member aperture 50 may have a first lower edge 290 and a first higher edge 400 disposed upwardly from a second lower edge 410 and a second higher edge 300 to create an offset 280.

In one embodiment the aperture 50 may be slighter higher on the right side of the second vertical member 30, than the left side aperture 50. When the right aperture 50 is higher than the left aperture 50, and the horizontal member 40 is disposed through both the right aperture 50 and left aperture 50, and when the horizontal member 40 extends rightwardly with the sign 90 hanging from the horizontal member 40, then the weight on the horizontal member 40 causes a clockwise force on the right and left apertures 50, thus causing the bottom of the right aperture 50, and top of the left aperture 50 to receive most of the force. This acts as a lock, keeping the horizontal member 40 in place, and preventing it from being pulled out. To remove the horizontal member 40, the right side would have to be raised and then pulled at a slight angle.

A clevis pin 230 may be removably yet securely positioned within a horizontal member aperture 200. A clip, such as a U-clip can be removably positioned through a hole at the lower end of the clevis pin 200. The U-clip 210 may then be connected to a sign 90 or another type of clip that may connect to the sign 90.

FIG. 1 also illustrates a solar light 320 secured to the horizontal member 40 to receive solar power from its top side, to power lights on the bottom side to illuminate a sign hanging below the solar light 320.

Figure 1A:
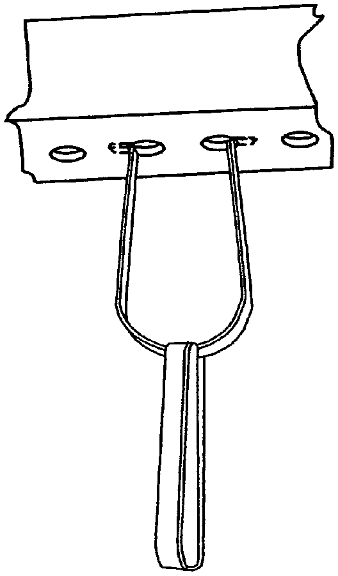
FIG. 1A is a pictorial of a clevis clip of the present invention.

FIG. 1A illustrates the use of a U-clip that may be removably disposed within the horizontal member aperture 40.

Figure 2:
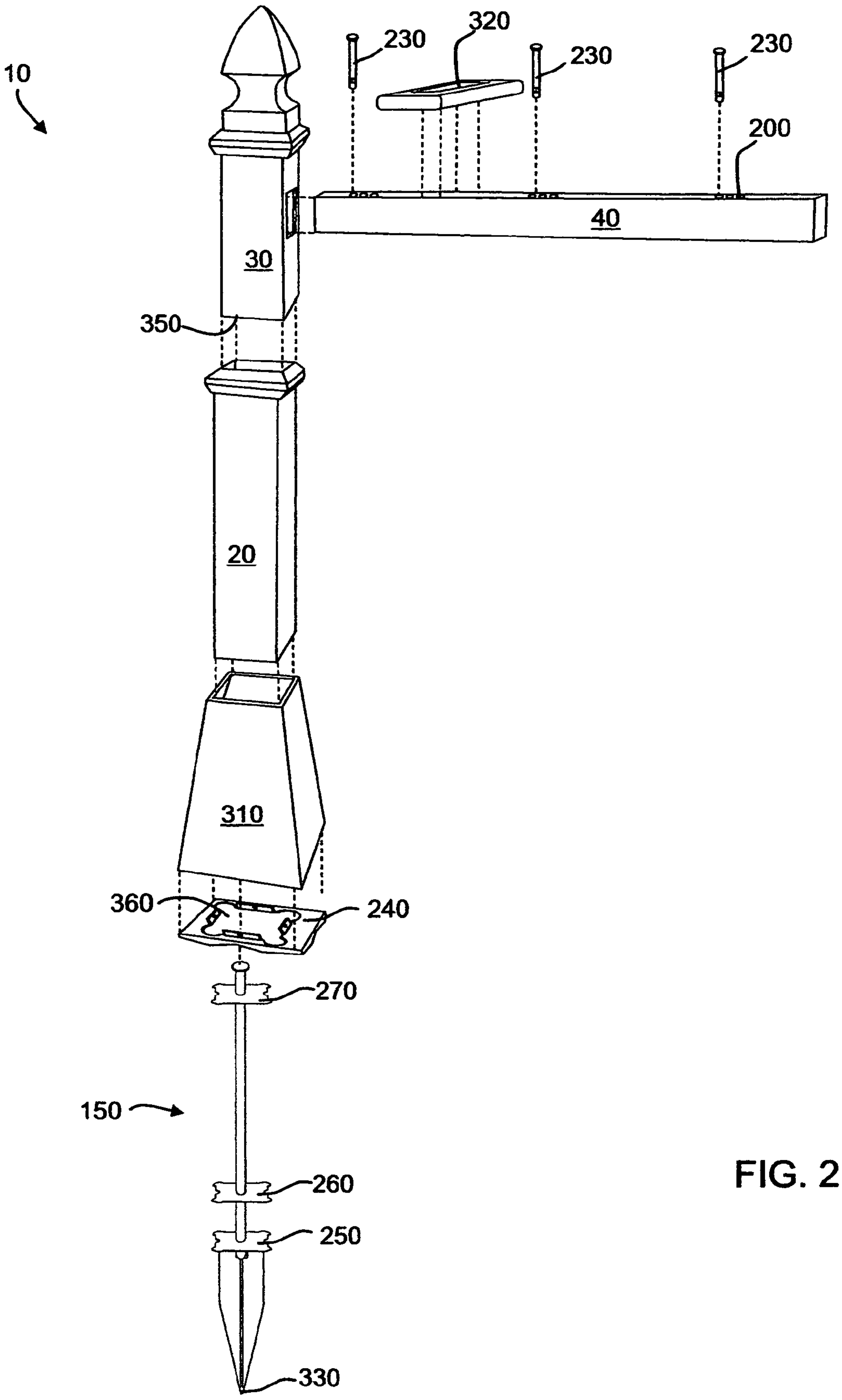
FIG. 2 is a pictorial of an embodiment of the present invention in a non-assembled configuration

FIG. 2 illustrates an embodiment of the collapsible sign post assembly in a "disassembled" state. The second vertical member 30 slides within the first vertical member 20. The stake 150 slides within the first vertical member 20. The bottom 350 of the second vertical member 30 contacts the upper plate 270. This way when the stake 150 is in the ground, the second vertical member 30 can extend upwardly from the first vertical member 20. A stabilizer plate 270 may be securely connected to the lower end of first vertical member 20. One means of connected the stabilizer plate 270 to the first vertical member 20 may be using four fasteners such bolts or screws. A decorative cover 310 may be slidably mounted on the first vertical member 20, and may rest on the stabilizer plate 270 or ground. The stake 150 may be able to be slidably disposed through the stabilizer plate 270 as the stabilizer plate 270 may have an opening 360 large enough for the stake 150 to pass through.

The second vertical member 30 may be telescopically disposed within the first vertical member 20, and the second vertical member 30 be able to slide within the first vertical member 20. For example, when lifting the first vertical member 20 upwardly from the ground or stake 150, then the second vertical member 30 may remain fixed with respect to the stake 150, but may telescopically be disposed or lowered with respect to the first vertical member 20.

The second vertical member 30 may be able to be adjustably secured in place relative to the first vertical member 20. For example, the second vertical member 30 may telescope out from the first vertical member 20, and be secured in place at different heights, depending on the desired height. The second vertical member 30 may be secured in place relative to the first vertical member via the height and position of the upper plate 270.

FIG. 2 also illustrates an embodiment as to how the sign may be disassembled. The horizontal member 40 may be removed from the aperture 50, and the clevis pins 230 removed from the horizontal member apertures 40.

FIG. 3 illustrates not only the offset 280 as referenced above, but also an embodiment wherein an insecticidal foam 340
may be disposed within the horizontal member 40 to repel bees, wasps, and other insects that may otherwise cause to live within any openings or spaces within the sign post assembly 10. The horizontal member aperture 40 may be disposed through the insecticidal foam or material.

The second vertical member 30 may be able to be adjustably secured in place relative to the first vertical member 20. For example, the second vertical member 30 may telescope out from the first vertical member 20, and be secured in place at different heights, depending on the desired height of the upper plate 270.

Figure 4:
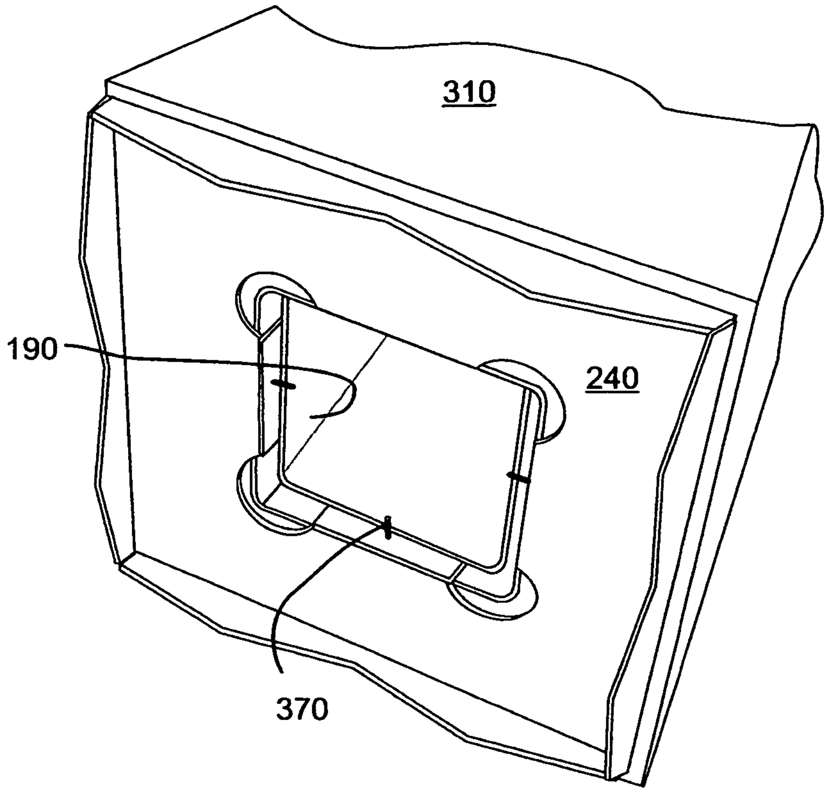
FIG. 4 is a pictorial view of the bottom of the decorative cover.

FIG. 4 illustrates one embodiment as to how the stabilizer plate 240 may be secured to the first vertical member 20 via a fastener 370. The decorative housing 310 may be sized to slide over at least a portion of the stabilizer plate 240.

Figure 5:
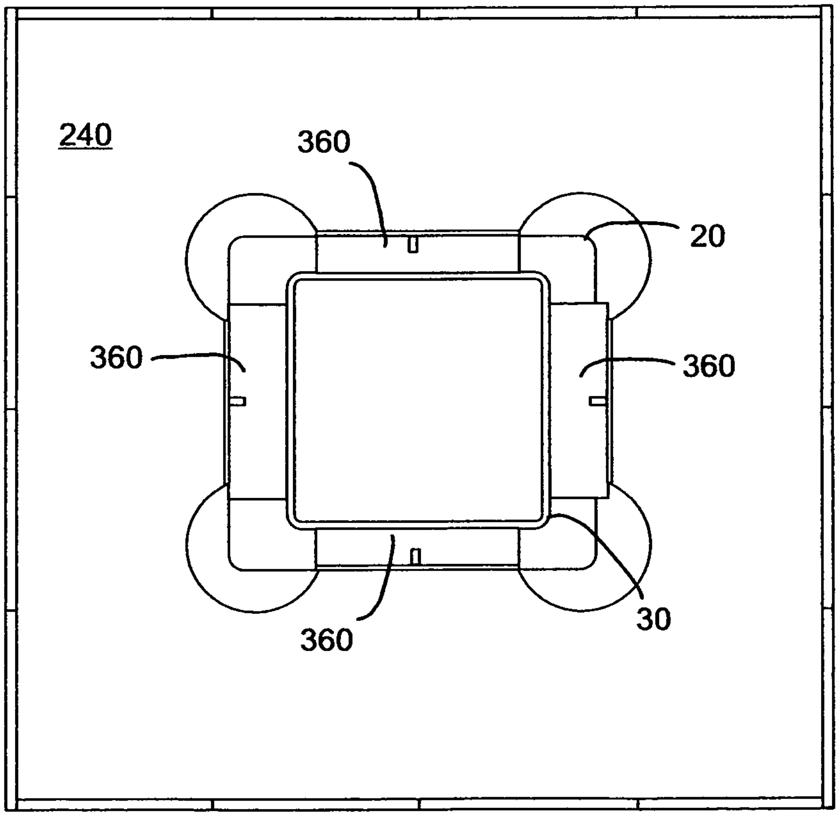
FIG. 5 is a pictorial view of an embodiment of a stabilizer plate.

FIG. 5 illustrates one embodiment of the present invention 10 whereby a slider 360 may be securely connected to the outside wall of the second vertical member 30 to slidably engage with the inside sleeve 190. In the case of a square shaped first vertical member 20, and square second vertical member 30 four sliders 360 may be used. The vermiculate sliders 360 may be secured near the bottom of the second vertical member 30. Or, there may be some sliders 360 near the bottom of the second vertical member 30, and some near the top of the second vertical member 30. In one embodiment of the present invention, the slider 360 may be made of vermiculite or a vermiculite-like material.

Figure 6:
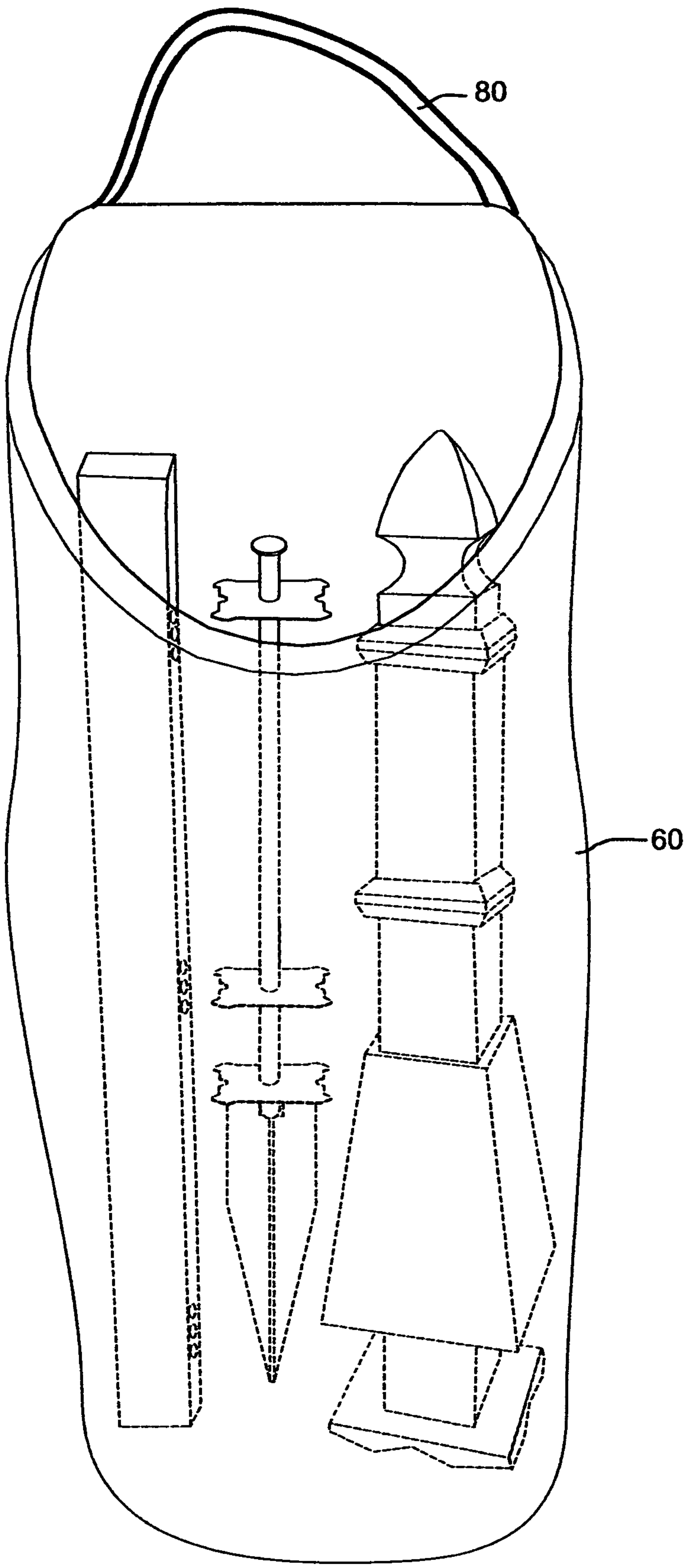
FIG. 6 is a pictorial view of the present invention disassembled and in a container.

As illustrated in FIG. 6, the components of the collapsible sign post assembly 10 may be stowed within a container 60. For example, the horizontal member 40 may be stowed within the hollow second vertical member 30, as illustrated in FIG. 4. And the ground support means 150 may be capable of being stowed within the first vertical member 20. The container 60, which can receive the collapsible sign post assembly 10. The container 60 may have a strap 80 so that the collapsible sign post assembly can be easily transported within small motor vehicles, and deployed at desired locations. In one embodiment the container 60 may have two compartments, one for the stake 150, the other for the sign assembly 20.

The second vertical member 30 may be slidably disposed within said first vertical member 20, so that it can telescope inward, for storage and transport, or upwardly when in use.

Figure 7:
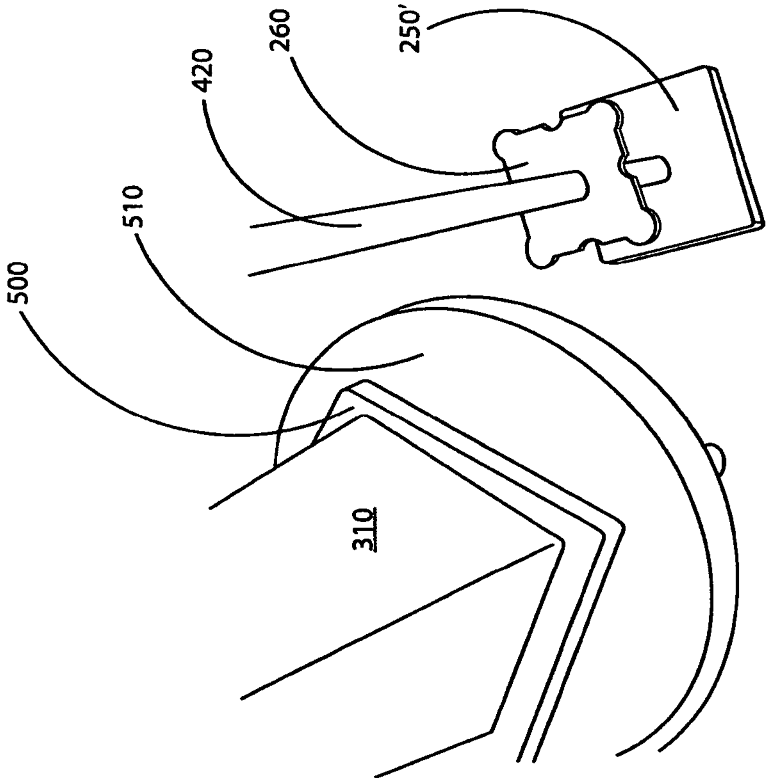
FIG. 7 is a pictorial view of a modified lower plate and a middle plate.

FIG. 7 illustrates a ground support means 150 having a pole 420 extending downwardly to a middle plate 250, and further extending downwardly to a modified lower plate 250'. FIG. 7 also illustrates an embodiment of an indoor base 510 of the present invention with the shock absorber plate 500 immediately upwardly adjacent to the indoor base 500, and the decorative lower cover 310 immediately above the shock absorber plate 500.

Figure 8:
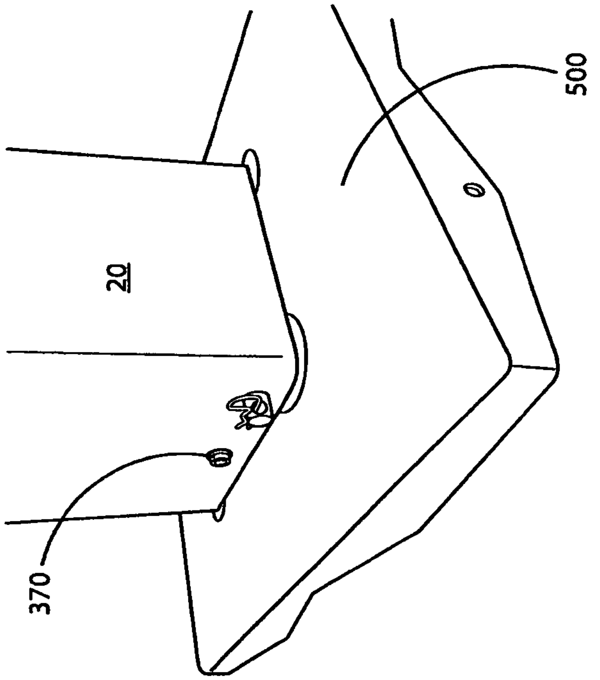
FIG. 8 is a pictorial view of an embodiment of a shock absorber plate of the present invention.

FIG. 8 illustrates one embodiment of how the first vertical member 20 may be secured to the shock absorber plate 500. A fastener 370 may secure the first vertical member 20 to the shock absorber plate 500 as also seen in FIG. 4 and FIG. 9.

Figure 9:
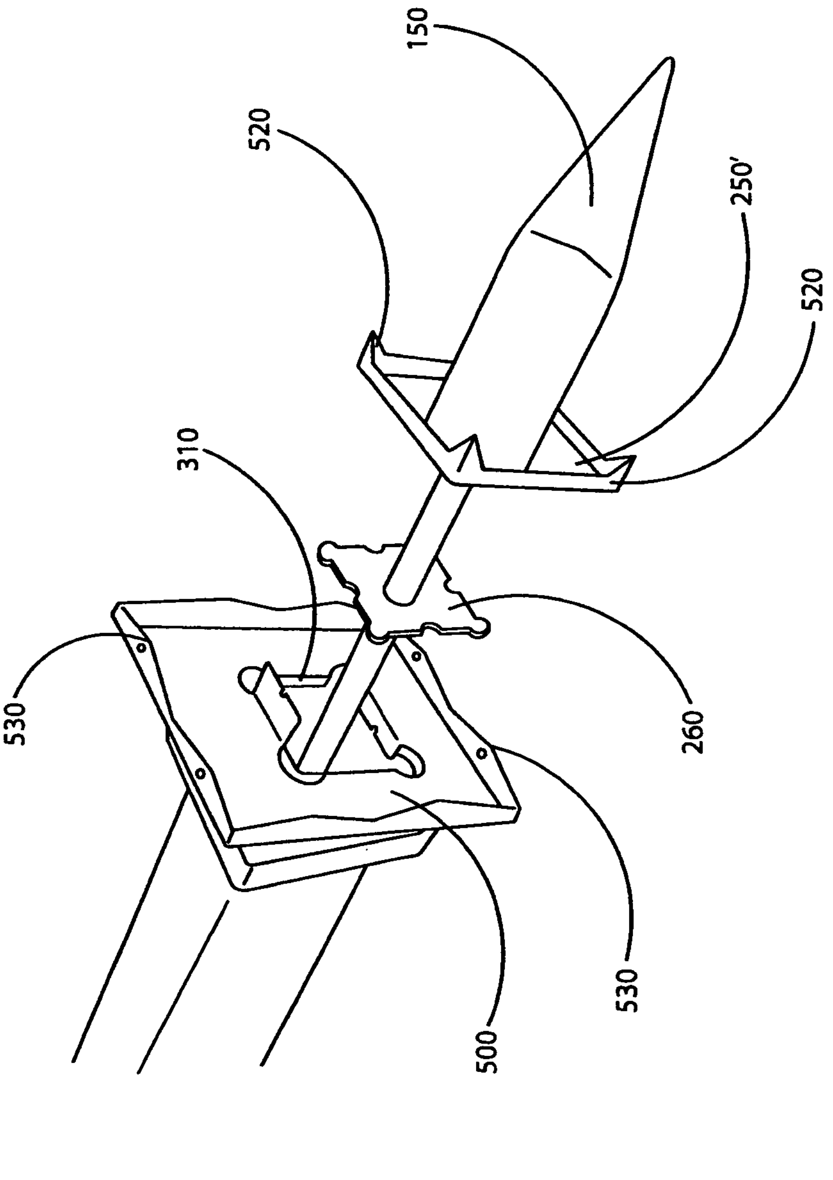
FIG. 9 is a pictorial view of an embodiment of the shock absorber plate and its relationship to the lower plate.

FIG. 9 illustrates an embodiment of the modified lower plate 250 having teeth 520 at each corner to better penetrate the ground and stabilize the collapsible sign post assembly 10. Downwardly from the modified lower plate 250' is the ground support means 150. Upwardly from the modified lower plate 250' the pole 420 extends upwardly to the middle plate 260. Upwardly from the middle plate 260 the pole 420 extends upwardly to the shock absorber plate 500 to which the first vertical member 20 is secured. Both the first vertical member 20 and the shock absorber plate 500 are then displaced downwardly where the shock absorber plate 500 is in contact with and immediately upwardly adjacent to the modified lower plate 250'. In this configuration, if there is any force acting upon the collapsible sign post assembly 10, the shock absorber plate 500 will counteract that force, keeping the collapsible sign post assembly in its desired, usually vertical position. This is so because the shock absorber plate 500 can be made from steel or aluminum and the outer edges 530 can be forced by compression, depending on the direction of the force, which causes the shock absorber plate 500 to bend and thus counteract the force upon the collapsible sign post assembly 10.

Figure 10:
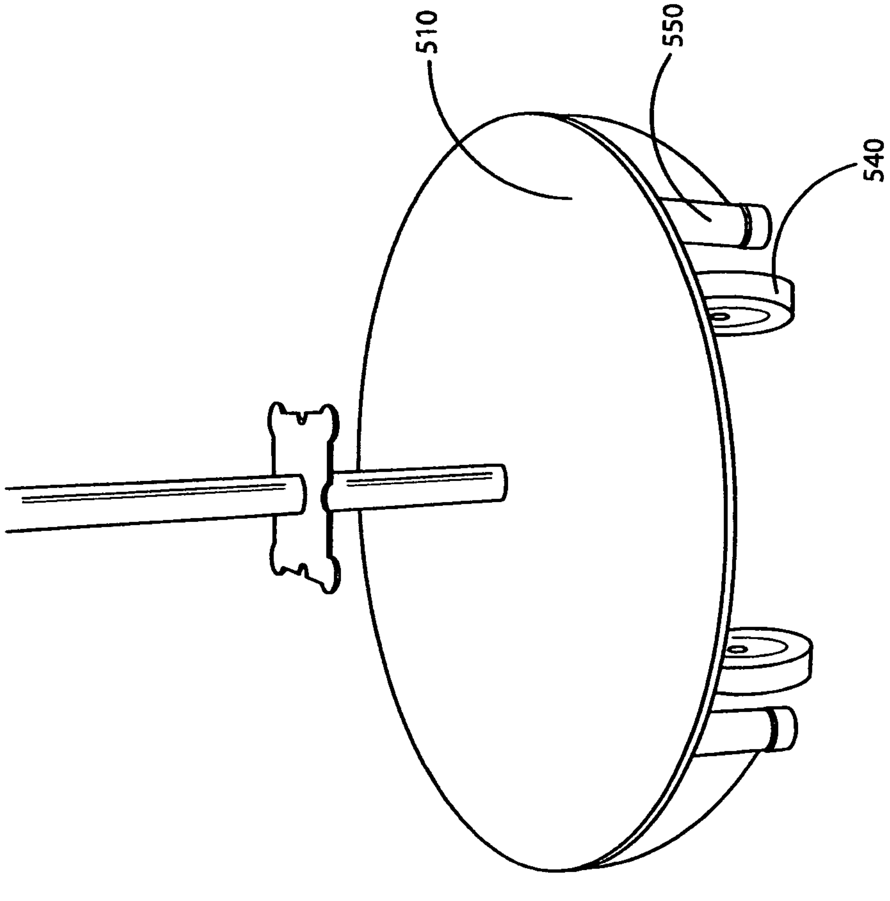
FIG. 10 is a pictorial of an embodiment of an indoor base having wheels.

FIG. 10 illustrates an embodiment of a indoor base 510 having a wheel 540 that, when the base 510 is resting in its base legs 550, then the wheel 540 may not touch the ground. However if the indoor base is to be moved, then one moves the base 510 toward the wheels 540 to raise the legs 550 off of the ground, so the wheel 540 may roll. The indoor base 510 may have one wheel 540 or two wheels 540.

Figure 11:
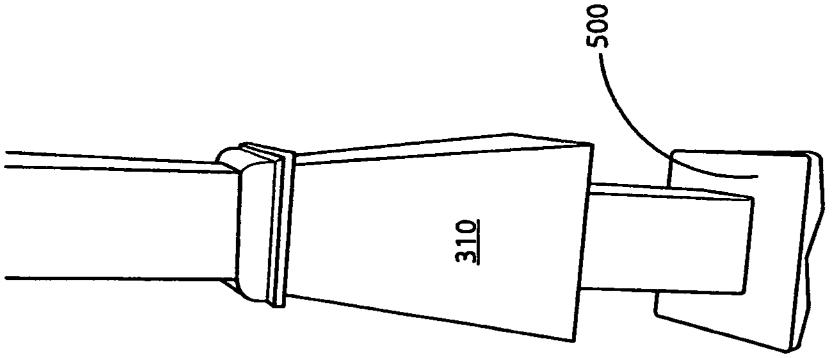
FIG. 11 is a pictorial view of a decorative lower cover and shock absorber plate.

FIG. 11 illustrates how the decorative lower cover 310 is disposed on the top of the shock absorber plate 500.

In one embodiment the second vertical member 30 may telescope upwardly with respect to the first vertical member 20 until it is stopped or prevented from further upward displacement by a means to stop upward displacement (not illustrated). The means to stop upward displacement of the second vertical member 30 with respect to the first vertical member 20 may be a collar on the second vertical member 30 that contacts another collar secured to the inside of the first vertical member.

In one embodiment the collapsible sign post assembly 10 may be made of a lightweight plastic, PVC, or composite material that has properties of lightweight and rigidity.

It should be understood, of course, that the foregoing relates to exemplary embodiments of the invention and that modifications may be made without departing from the spirit and scope of the invention as set forth in the following claims.

I claim:

1. A deployable collapsible sign assembly (10), comprising:

a pole (420), said pole (420) having an upper plate (270);

a first vertical member (20) slidably disposed over said pole (420), said first vertical member (20) secured to a shock absorber plate (500) at a lower end;

a second vertical member (30) slidably disposed within said first vertical member (20), said second vertical member (30) having a bottom (350) capable of contacting said upper plate (270) to prevent said second vertical member (30) from further downward displacement, said second vertical member (30) having a second vertical member aperture (50) that is higher on one side then the other to create an offset (280);

further comprising an circular shaped indoor base (510) having a pole (420') extending upwardly therefrom; said pole having a middle plate (260) disposed upwardly from said indoor base (510) to receive said first vertical member (20);

a shock absorber plate (500) immediately upwardly adjacent to the indoor base (510), and the decorative lower cover (310) immediately above the shock absorber plate (500), having a wheel (540) that, when the base (510) is resting in its base legs (550), then the wheel (540) does not touch the ground;

whereby if the indoor base is to be moved, then one moves the base (510) toward the wheels (540) to raise the legs (550) off of the ground, so the wheel (540) may roll.

2. The apparatus of claim 1, further comprising an upper plate (270) dispose upwardly from said middle plate (260) said second vertical member (30) having a bottom (350) capable of contacting said upper plate (270) to prevent said second vertical member (30) from falling downwardly.

3. The apparatus of claim 1, further comprising a wheel (540) rollably disposed on said indoor base (510), and a base leg (550), whereby the apparatus (10) can stand upright, or can be tilted back for rolling on said wheel (540) to move the apparatus (10).

4. A collapsible sign post assembly (10), consisting of:

a first vertical member (20) having an inner sleeve (190);

a second vertical member (30) slidably disposed within said first vertical member (20), said second vertical member (30) capable of sliding within said first vertical member for storage, said second vertical member (30) having a bottom (350) that is capable of contacting an upper plate (270) on a pole (420); said first vertical member (20) extending downwardly, whereby when said first vertical member (20) is positioned downwardly over pole (420), said second vertical member (30) having a second vertical member aperture (50);

said second vertical member aperture (50) having a first lower edge (290) and a first higher edge (400) disposed upwardly from a second lower edge (410) and second higher edge (300) to create an offset (280), whereby when a horizontal member (40) is removably disposed within said second vertical member aperture (50) any downward force against said first lower edge (290) secures the horizontal member (40) in place, whereby said second vertical member (30) may telescope upwardly with respect to said first vertical member (20).

5. The apparatus of claim 4, further comprising:

a slider (360) fixedly disposed near the bottom of said second vertical member (30) that is capable of being in sliding contact with an inner sleeve (190) of said first vertical member (20), said slider (360) made of a vermiculite-like material.

6. The apparatus of claim 4, wherein a stabilizer plate (240) is secured to the lower end of the first vertical member (20).

7. The apparatus of claim 4, wherein said horizontal member (40) has an insecticide substance within said horizontal member (40).

8. The apparatus of claim 4, further comprising:

a solar light (320) secured to said horizontal member (40) to illuminate a sign below said solar light.

9. The apparatus of claim 4, further comprising:

a container (60) capable of receiving, housing, and transporting the components of the collapsible sign post assembly, said container (60) having a strap (80) to carry said container (60).

* * * * *